FIG. 1

INVENTOR.
ROBERT B. J. BRUNN

Dec. 13, 1949 — R. B. J. BRUNN — 2,491,029
SYSTEM FOR TRANSLATING PULSE SIGNALS OF VARIABLE TIME DELAY
Filed July 11, 1947 — 2 Sheets-Sheet 2

*INVENTOR.*
ROBERT B.J. BRUNN
BY John P. Harvey
ATTORNEY

Patented Dec. 13, 1949

UNITED STATES PATENT OFFICE 2,491,029

SYSTEM FOR TRANSLATING PULSE SIGNALS OF VARIABLE TIME DELAY

Robert B. J. Brunn, Manhasset, N. Y., assignor to Hazeltine Research, Inc., Chicago, Ill., a corporation of Illinois Application July 11, 1947, Serial No. 760,360

17 Claims. (Cl. 343—13)

This invention is directed to systems for translating pulse signals which may occur with a time delay, relative to a reference time, that is variable over a predetermined range of time delays. Although the invention is subject to a wide variety of applications and may be adapted to communication fields generally, as well as to time measuring or ranging systems, it is especially useful in distance-measuring equipment and, for convenience, will be described in that connection.

A prior distance-measuring equipment is known, having been proposed for aircraft installation to enable a pilot to determine the distance of his craft from known ground stations or beacons. The airborne apparatus comprises a transmitter-receiver combination for sending out pulse-type challenging signals to trigger a selected beacon and for receiving and interpreting the pulse-modulated beacon reply in order to indicate the distance between the plane and beacon. In an effort to free the equipment from the adverse effects of challenging signals transmitted by other planes in the vicinity and beacon repliers responsive thereto, the receiver is provided with a search feature.

To accomplish searching, the prior apparatus includes a receiver having a modulation-signal translating channel that is normally blocked and a gating system for conditioning the channel to translate pulses which may be received within a short gating interval. Varying the time relation of the gating interval relative to the transmission of the challenging pulse is effective to achieve searching, as will be apparent from the consideration of an example. Assume that the receiver is gated, that is, conditioned to translate pulses, immediately after the challenge is sent out. Then if a reply is returned directly, as in the case where the plane is very close to the beacon, the reply is accepted and a distance indication obtained. If the reply should be delayed beyond the duration of the short gating interval, indicating a greater separation from the craft to the beacon, that reply is not accepted. However, delaying the gating interval relative to the transmitted challenge may condition the receiver to accept the delayed answer and establish an indication of the greater distance from plane to beacon. The system under consideration has a search system which increases the delay of the gating interval in a continuous, uninterrupted manner over a range of delay times with respect to the transmission of the challenge to search a prescribed range of distances, looking for a reply from which it may ascertain its distance. When the reply has been found, the search is discontinued and a tracking circuit energized to keep the reply within the gating time to facilitate an accurate determination of distance.

It is apparent that if a single reply pulse were to interrupt the search, any stray signal would be able to accomplish that function and establish an erroneous indication of distance. To avoid that undesired result, the equipment includes a peak rectifier having a discharge time constant so selected that two reply pulses received within the duration of the gate are necessary to develop a potential exceeding a critical level at which the search is ended and tracking initiated. While the described system has limited utility, it is found that far greater freedom from the effect of stray pulses is realized where the search is disabled only upon receipt of a larger number of replies within a given position or setting of the gating interval relative to the challenge. By way of illustration, if the prior arrangement ends the search process upon receipt of two replies out of six challenges sent out within the gating time, improved performance and increased freedom from the effects of undesired signals are achieved by requiring three replies to be received out of nine challenges and still further improvement follows by requiring at least five replies from fifteen challenges. The described equipment, however, does not lend itself to accurate response to a minimum of more than two replies within the gating time and, accordingly, is not able to derive the benefits inherent in such a mode of operation.

It is an object of the present invention, therefore, to provide a new and improved system for translating pulse signals of a variable time delay and one which avoids the aforementioned limitation of prior arrangements.

It is another object of the invention to provide a new and improved system for translating pulse signals which may occur with a time delay, relative to a reference time, that is variable over a predetermined range of time delays.

It is another object of the invention to provide a system for translating pulse signals of a variable time delay and one having a new and improved searching arrangement for locating the pulses within a permissible wide range of delay times.

In accordance with one feature of the invention wherein a gating system is employed for conditioning a receiver to translate pulses of signal energy received throughout a short gating interval, a new and improved arrangement is provided for controlling the time relation of the gating interval. This arrangement essentially constitutes a sweep means, including a control-pulse generator, for applying synchronizing pulses to the synchronizing circuit of the gating system so to control that system that the occurrence of the gating interval relative to a reference time, such as the transmission of a challenging pulse, sweeps in discrete steps over a range of delay times at a rate determined by the repetition frequency of the control pulses.

In accordance with another feature of the invention, a system of the type under consideration for translating pulses of signal energy of a variable time delay includes a counter circuit for counting the number of pulses received during any gating interval. This feature also contemplates sweeping the gating interval through a wide range of permissible time delays to effect searching and also includes means for resetting the counter circuit at spaced intervals as the gating interval sweeps in a search cycle.

In accordance with a preferred embodiment of the invention, a system for translating pulses of signal energy which may occur with a time delay, relative to a reference time, that is variable over a predetermined range of time delays comprises a channel for translating the pulses but normally maintained in a nontranslating condition. A counter circuit is coupled to the channel for counting the number of pulses translated therethrough and a gating system is provided for conditioning the channel to translate pulses received throughout a gating interval of a preselected duration small relative to the aforesaid range. There is also provided sweep means, including a control-pulse generator, for so controlling the gating system that the occurrence of the gating interval relative to the aforementioned reference time sweeps in discrete steps over the range at a rate determined by the repetition frequency of the control pulses supplied by the generator. Finally, there are means responsive to the control pulses for establishing a predetermined setting of the counter circuit with each sweep step of the gating interval.

For a better understanding of the present invention, together with other and further objects thereof, reference is had to the following description taken in connection with the accompanying drawings, and its scope will be pointed out in the appended claims.

Figure 1:
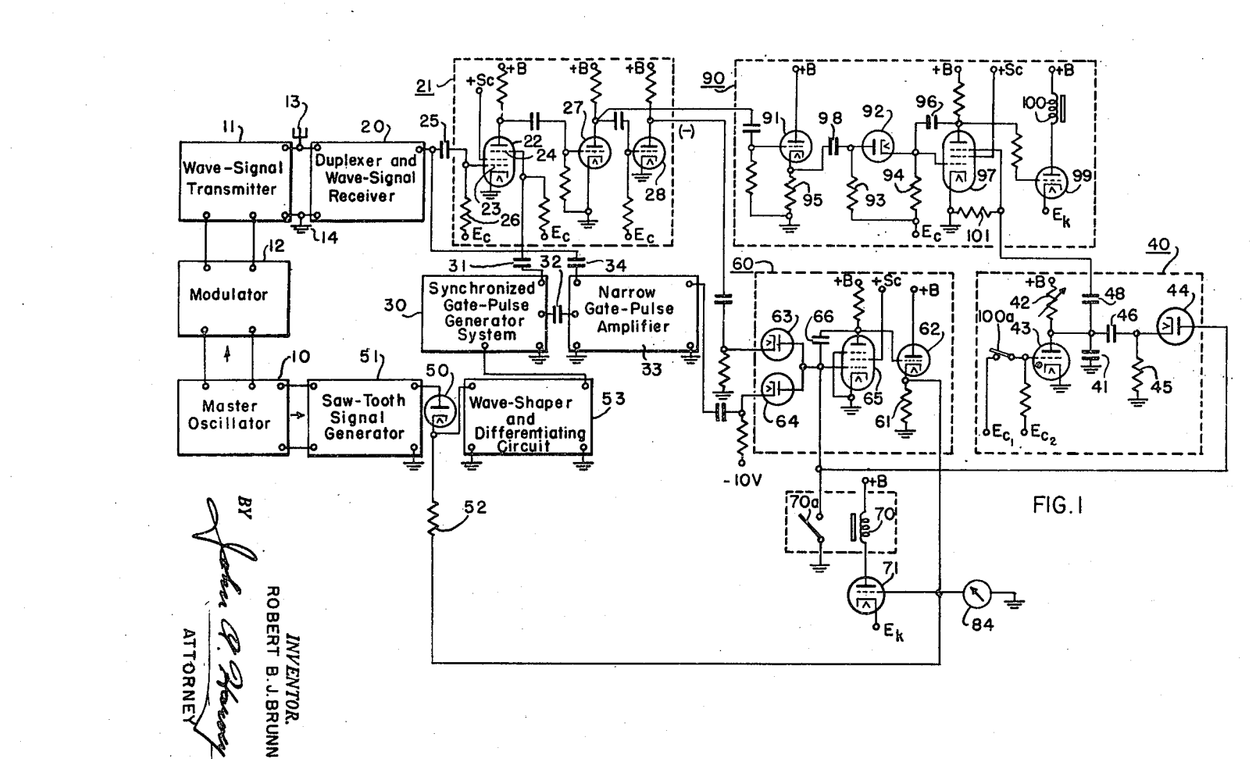
Fig. 1 is a schematic representation of a distance-measuring equipment embodying the present invention.

Referring now more particularly to Fig. 1, the distance-measuring equipment there represented will be assumed to be installed in an aircraft. It includes a master oscillator 10, or timer, relied upon for timing the operation of certain components of the equipment. In describing the principal components, it is convenient to refer to the transmitter and receiver portions separately. The transmitter 11 is designed to transmit challenging wave signals of pulse wave form and relatively short pulse duration in accordance with accepted practice in pulse-modulated ranging systems. One output circuit of master oscillator 10 is connected with the input circuit of a modulator 12 having an output circuit which, in turn, is connected with a modulating or input circuit of wave-signal transmitter 11. The units thus far described may be of any well-known design and construction and for that reason have been represented in block diagram. Usually, modulator 12 is arranged to supply to transmitter 11 a modulating potential of pulse wave form for determining the repetition rate and duration of the challenging pulses to be transmitted. The output circuit of transmitter 11 is connected with an antenna-ground system 13, 14 which is also shared by the receiving portion of the equipment.

The receiving portion may be considered as a system for translating pulse signals which may occur with a time delay, relative to a reference time, that is variable over a predetermined range of time delays. As used in this detailed description, the expression "reference time" is intended to relate to the operating interval of transmitter 11 during which a challenge wave-signal pulse is radiated. Additionally, the "range of time delays" referred to is intended to indicate the effective operating range of the equipment, inasmuch as the delay between the transmission of a challenge pulse and the reception of a related reply pulse is directly related to the distance or range from the measuring equipment to the replying station whether that station be a ground beacon, another aircraft or any other apparatus intended to accept and answer a transmitted challenge.

The pulse-translating system or receiver portion of the equipment under consideration comprises a channel for translating received reply pulses but normally maintained in a nontranslating condition. This channel is represented by the duplexer and wave-signal receiver 20 to which is coupled an amplifier 21, termed a "wide-gate pulse amplifier" for reasons to be made clear hereinafter. The duplexer of unit 20 is any well-known protective device for protecting the receiver during operating intervals in which transmitter 11 is sending out a challenge. One form of duplexer is represented in Patent 2,415,318, issued May 4, 1947, to Harold A. Wheeler, and assigned to the same assignee as the present invention. The receiver portion of unit 20 may be a super-regenerator, superheterodyne or any other type of receiver well known in the art.

Amplifier 21 has a first stage including a vacuum tube 22 of the pentodetype having first and second control electrodes 23 and 24, respectively. The input circuit of the tube, represented by electrode 23 and the grounded cathode, is connected with the output circuit of unit 20 through a condenser 25, a resistor 26 and a source of grid-bias potential $E_c$. The output circuit of this tube is coupled through a similar arrangement of a condenser and a resistor to the input circuit of a second amplifier stage, comprising triode tube 27. The latter, in turn, has a similar connection with the input circuit of a final stage provided by a triode tube 28. The anode elements of each of these tubes is connected with a source of space current which, throughout the remainder of this description, is designated by $+B$. Also the designation $E_c$, unless otherwise specified, is intended to represent a grid-bias source.

The number of stages included in unit 21 are so selected that the output of the final stage, when a reply pulse is translated, is of negative polarity as indicated in the drawing. Tube 22 is normally biased to cutoff by the source $E_c$, maintaining the channel of which it forms a part in a nontranslating condition and its operating potentials are selected to require the presence of coincident pulses of positive polarity on its two control electrodes 23 and 24 to permit signal translation through the amplifier.

The system under consideration includes a gating system 30 for conditioning the channel 20—21 to translate pulses received through a gating interval of a preselected duration, small relative to the range of time delays within which reply signals may be received. This system generates both wide and narrow gating pulses to be utilized in a manner to be indicated hereinafter and may include any well-known forms of pulse-generating circuits having time constants or other circuit parameters chosen to develop pulses of desired durations and controllable separation. In order accurately to time the generation of the gating pulses, it will be understood that the pulse-generating system 30 has synchronizing circuits responsive to applied synchronizing-signal pulses to initiate one operating cycle of the system. The output circuit of gate-pulse generator 30 to which the wide-gate pulses are delivered is coupled through a condenser 31 to the second control electrode 24 of tube 22 in wide-gate pulse amplifier 21. The output circuit of generator 30 to which the narrow-gate pulses are supplied is coupled through a condenser 32 to the input circuit of a narrow-gate pulse amplifier 33 which is essentially the same in construction as wide-gate amplifier 21 but exhibits a higher gain. The output circuit of the receiver portion of unit 20 is connected through a condenser 34 to the first stage of narrow-gate amplifier 33, this stage being adjusted to require coincidence of a narrow-gate pulse from generator 30 and a reply pulse from unit 20 to produce an output from amplifier 33. The amplifier includes such a total number of stages that a pulse translated therethrough appears at its output terminals with positive polarity, as indicated on the drawing.

The occurrance of the wide and narrow gating intervals relative to the transmission of a challenge pulse is determined by the generation of the gate pulses and is under the control of a sweep-control pulse generator for controlling the application of synchronizing pulses to the synchronizing circuits of gate-pulse generator 30. This control is such that each gating interval sweeps in discrete steps over the contemplated range of permissible time delays and at a rate determined by the repetition frequency of the control pulses. The control-pulse generator referred to is indicated by the broken-line rectangle 40. It comprises essentially a relaxation oscillator provided by a condenser 41 connected with a charging source +B through a resistor 42 which, preferably, is variable to adjust the repetition rate of the generated control pulses. A vapor-electric or gaseous-discharge tube 43 has its anode and cathode electrodes connected across condenser 41 to provide a discharge path therefor during operating intervals in which tube 43 is rendered conductive. Tube 43 has a control electrode with which bias potentials $E_{c_1}$ and $E_{c_2}$ are associated through a switch or relay contact 100a. These biases have such values that when the switch is opened tube 43 is maintained in a nonconductive state, whereas when the switch is closed, as shown, the tube may break down in the presence of a potential applied to its anode and cathode electrodes by the charging of condenser 41. The cathode of a diode rectifier 44 is coupled through a condenser 46, having a charging resistor 45, to the high-potential side of condenser 41 and to the anode of gas tube 43. The anode of diode 44 is connected with an energy-storage device or condenser 66 included within a tracking circuit, designated by broken-line rectangle 60, and described more particularly hereinafter. The condenser is to be charged in step-by-step fashion by the rectified pulses and the charge established on condenser 66 determines the time delay exhibited by means, presently to be described, for applying synchronizing pulses to the synchronizing circuits of gate-pulse generator 30.

The synchronizing means just referred to comprises another diode 50 which provides in operation a time delay determined by and directly related to a delay bias established on its cathode. This bias is applied to diode 50 through a resistor 52 from the cathode load resistor 61 of a cathode-follower type of amplifier 62 also included within tracking circuit 60 to be described presently. The anode of diode 50 is connected with the output circuit of a saw-tooth signal generator 51, having a synchronizing circuit connected with a second output circuit of the master oscillator or timer 10. The saw-tooth generator 51 may be of conventional construction and, as synchronized by oscillator 10, operates at the same pulse period as transmitter 11. Its saw-tooth potential has a relatively long trace portion and a much shorter retrace portion. The trace portion of the generated saw tooth has a duration which is at least equal to the range of time delays throughout which it is contemplated to receive pulses in the equipment. The cathode of diode 50 connects with a conventional wave shaping and differentiating circuit 53, having an output circuit which applies a differentiated signal as a synchronizing potential to the synchronizing circuits of gate-pulse generator 30. Unit 53 may include an amplifier for amplifying and shaping a saw-tooth potential derived from diode 50 into a rectangular pulse and a differentiator for differentiating that pulse.

Returning now to a further consideration of the tracking circuit 60, this circuit has a pair of diodes 63 and 64 arranged with the cathode of the former coupled to the output stage of wide-gate amplifier 21 and the anode of the latter diode connected with the output stage of narrow-gate amplifier 33. The remaining electrodes of these diodes are connected together and to the input circuit of a direct-current amplifier including a pentode tube 65. Condenser 66 is connected between the anode and control electrode of tube 65 and the junction of this condenser with the control electrode is also connected to the anode of rectifier 44 in the control-pulse generator 40, as previously indicated. The output circuit of amplifier 65 is connected with the input electrodes of cathode follower 62 already described. The junction of the anode of tracking diode 64 and its input coupling condenser is returned to a source of negative potential designated —10 volts, the value being selected to exceed the potential swing of the control electrode of D. C. amplifier 65. The corresponding point of the other tracking diode circuit is returned to ground.

The conjoint operation of units 40, 50—53 and 60 control the synchronizing of gate-pulse generator 30 to sweep the gating interval in discrete steps over a desired range to effect searching. This will be made more clear in the explanation of the operation of the over-all system.

Where the equipment fails to receive a preselected number of replies in any step position of the wide gate as the gating interval sweeps over its entire time delay range, means are actuated to initiate a second cycle of operation to repeat the search. This means comprises a relay 70 included in the output circuit of a triode 71 normally biased to cutoff by a cathode-delay bias $E_k$. Energization of relay 70 closes a normally opened relay contact 70a to complete a fast discharge time constant circuit for condenser 66 of unit 60 to discharge that condenser and begin the sweep anew. The relay 70, although schematically represented, has a sufficient delay to permit the required discharge of condenser 66 before the relay again restores contact 70a to its initial position. The input circuit of tube 71 is connected with cathode resistor 61 of cathode follower 62.

The range indicator is represented as a voltmeter 84 for measuring the potential developed across load resistor 61 of cathode follower 62 because the conductivity of that stage is directly determined by the charge on condenser 66 and, therefore, is directly related to the position of the wide-gating interval within the range over which condenser 66 causes the gating interval to be swept in the searching process.

The receiver portion of the distance-measuring equipment further includes a counter circuit coupled to channel 20—21 for counting the number of pulses translated therethrough. This counter circuit is included within the broken-line rectangle 90 and comprises a cathode follower provided by the vacuum tube 91 having an input circuit connected to the output circuit of the second stage 27 of wide-gate amplifier 21. A condenser 98 couples the anode of a diode 92 to the high-potential terminal of the cathode-load resistor 95 of cathode follower 91 for rectifying pulses translated through channel 20—21 and supplied to unit 90. The counter circuit comprises an energy-storage device or condenser 96 to be "step charged" by the rectified pulses; by "step charging" is meant the accumulation of an incremental charge with each detected pulse. One terminal of condenser 96 is directly connected with the cathode of diode 92 and with the first control electrode of a pentode tube 97. A bias-potential source $E_c$ is connected through a resistor 94 to this control electrode and is connected through a charging resistor 93 to the junction of the anode of diode 92 and its input coupling condenser 98. The other terminal of the condenser 96 is connected with the anode of tube 97. This arrangement of condenser 96 and tube 97 is similar to that for condenser 66 and tube 65. It normally establishes a very slow discharge time constant for the condenser, but the counter includes a reset or fast-discharge circuit for condenser 96 which is normally inactive. The fast-discharge path for the counter condenser 96 includes the grid-to-cathode circuit of tube 97 and is normally nonconductive because the operating potentials are selected so that tube 97 is normally biased to cutoff. The output circuit of tube 97 is connected with the input circuit of a normally conductive triode amplifier 99, including a search relay apparatus 100 in its anode circuit.

The search relay 100 constitutes means responsive to a preselected setting of the counter circuit, established when a preselected number of reply pulses are translated by channel 20—21 within a given gating interval, for disabling the search system. To this end, search relay 100 controls a relay contact 100a which determines the operating bias for the control-pulse generator 43 of unit 40. The relay normally keeps contact 100a closed but, when actuated, it opens the contact to vary the operating bias of tube 43. In the event that this preselected number of pulses are not received and translated within a particular setting of the gating interval, the counter circuit is reset. This is accomplished by means responsive to the control pulses from the relaxation oscillator of unit 40 for actuating the reset or fast-discharge circuit for condenser 96. This means comprises a suppressor electrode provided in tube 97, the suppressor electrode being coupled through a condenser 48 to the condenser 41 of the relaxation oscillator 43 and being coupled by a resistor 101 to the cathode of tube 97.

Figure 2:
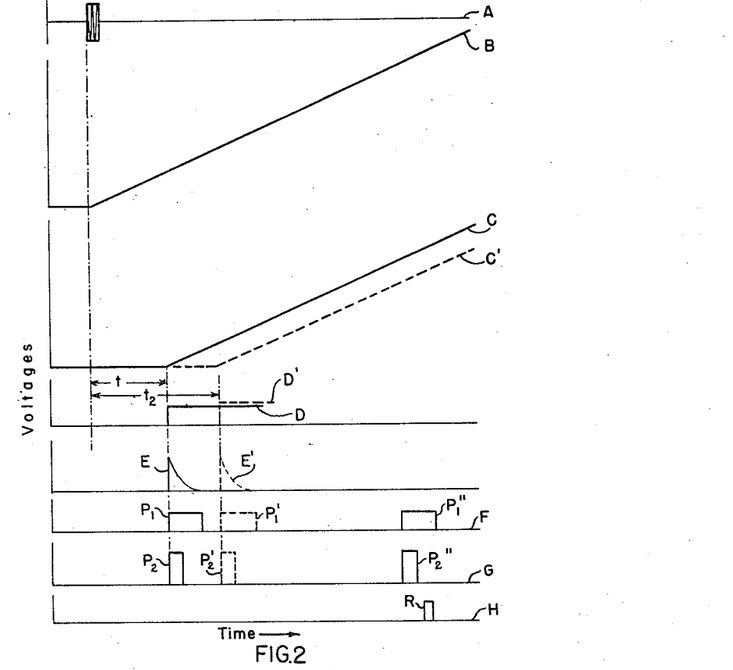
Figs. 2 and 3a—3b comprise graphs utilized in explaining the operation of that equipment.

In considering the operation of the equipment just described, it will be assumed initially that challenges are sent out by transmitter 11 but that no beacon receives and answers the challenges. It will also serve to simplify the description if it be assumed that the repetition rate of the challenging pulses is 150 times per second and that the operating frequency of the relaxation oscillator of unit 40 is 10 times per second. At the instant the equipment is started, master oscillator 10 energizes modulator 12 to initiate the operation of transmitter 11 to transmit a challenging pulse. Simultaneously therewith, oscillator 10 triggers saw-tooth generator 51 to generate a potential of saw-tooth wave form. The transmitted challenge may be as represented by curve A of Fig. 2 and the saw-tooth signal from generator 51 may be represented by curve B. At the time this challenge is transmitted, the gate-pulse generator 30 is idle, supplying no gate pulses to either the wide-gate amplifier 21 or narrow-gate amplifier 33. At the same time, relay contact 100a is closed, condenser 41 of the relaxation oscillator in unit 40 is starting to charge from the source +B and condenser 66 has an initial or reference charge. The operating potentials applied to cathode follower 62 of tracking circuit 60 determine the conductivity of that tube and thereby the value of potential which is developed across its load resistor 61 and applied as a delay bias to the cathode of diode 50, the latter directly controlling the delay or timing of gate-pulse generator 30. Immediately upon the transmission of the first challenge pulse, the anode potential of diode 50 starts to increase in accordance with curve B. When the anode potential exceeds the delay bias on the cathode of the diode, the diode conducts to supply the signal of curve C to wave shaping and differentiating circuit 53. The delay exhibited by the diode circuit in delivering the signal of curve C to unit 53 is shown in Fig. 2 as the time $t$. It may be zero or any other value desired and is determined by the initial conditions of the system giving rise to the delay bias of diode 50. The amplifying stages of unit 53 shape the saw-tooth potential of curve C into the rectangular pulse, or step impulse of curve D. The differentiating circuit of unit 53 responds to this pulse and develops a control potential or synchronizing pulse represented by curve E and having a leading edge occurring at the end of delay time $t$. The synchronizing pulse of curve E, as applied to the synchronizing circuits of gate-pulse generator 30, causes the generation of the wide-gate pulse $P_1$ of curve F and the narrow-gate pulse $P_2$ of curve G. These gating pulses are applied, respectively, to the first stages of wide-gate amplifier 21 and narrow-gate amplifier 33 to condition the receiver channels as extended through each of these amplifiers to translate any beacon reply pulses received throughout gating intervals of small durations, individually corresponding with the duration of each of the wide-gate and narrow-gate pulses. For the assumed conditions in which no beacon is replying to the challenge, no pulse is translated through the receiver even though it is conditioned for pulse translation by the gating pulses $P_1$ and $P_2$.

The conditions thus far described, namely the transmission of a challenge pulse and the application of gating pulses to the gate amplifiers 21 and 33, is repeated 15 consecutive times because it has been assumed that the challenging rate is 150 times per second while the operating rate of the control generator 43 of unit 40 is 10 times per second so that 15 challenges occur within each operating cycle of the relaxation oscillator of unit 40.

At the end of these 15 challenges condenser 41 of unit 40 has accumulated a sufficient charge to break down tube 43, thereby to generate at the cathode of diode 44 a control pulse of negative polarity. This pulse, which is rectified by diode 44, puts an incremental or step charge of negative polarity on condenser 66. The charge of this condenser, as applied to the input circuit of tube 65 within tracking circuit 60, reduces the conductivity of that tube and causes its plate potential to rise by a related increment. The cathode potential of cathode follower 62 increases accordingly and increases the delay bias on diode 50. When the next challenge is sent out, the delay of synchronizing pulse applied to the gate-pulse generator 30 is increased one step by virtue of the step type of increase of the delay bias applied to diode 50. In other words, the increased delay in synchronization may have a value indicated at $t_2$ in Fig. 2 where the broken line curves C', D', E', P₁', and P₂' represent, respectively, the new time relation of the output signal of diode 50, the rectangular pulse and synchronizing pulse developed in unit 53, the wide-gate pulse and the narrow-gate pulse relative to the transmitted challenge of curve A. This demonstrates that the first operating cycle of the relaxation oscillator 43 steps the wide-gate interval one discrete step along its range. Since it is being assumed that no beacon is answering the challenge, this condition remains for the next 15 consecutive challenges. At the end of that time, condenser 41 again discharges through tube 43 to add a second incremental or step charge to condenser 66. This adds a further step increase to the delay bias of diode 50, delaying the generation of the gate pulses for another discrete step. In this manner, as the relaxation oscillator repeats its operating cycle, the occurrence of the gating intervals relative to the transmission of the challenge pulse advances in discrete steps over the desired range of time delays at a rate determined by the operating frequency of the relaxation oscillator.

When the gate pulses have been advanced to the most remote portions of their time-delay range, corresponding to the time required to receive replies from the most distant beacons intended to be contacted by this equipment, and no reply has been received, the next succeeding pulse generated in the relaxation oscillator of unit 40 terminates the instant sweep cycle and re-initiates it as follows.

The incremental step charging of condenser 66 of unit 40 causes the control electrode of tube 65 to become progressively more negative with the application of each pulse from the relaxation oscillator. After the last position of the search has been completed, the grid potential of tube 65 causes its anode potential to be so positive that the potential developed by the cathode load resistor 61 of cathode follower 62 overcomes the delay bias $E_k$ on the cathode of tube 71 to render the latter conductive and actuate the relay 70. As the relay is operated and closes its normally open contact 70a, a fast-discharge path is completed for condenser 66 to effect a discharge of that condenser and thereby restore it to the condition obtained at the start of the sweep cycle. With condenser 66 discharged, the cathode load resistor 61 assumes its initial potential and returns the delay bias of diode 50 to its original value. This, then, reconditions the apparatus for another search sweep cycle and during that cycle the gating intervals are again delayed, relative to the transmission of the challenge pulse, in discrete steps over the same range of time delays again to complete a search for responses throughout the entire range of the equipment.

Having observed the operation of the system in the absence of reply pulses, consideration may now be given to features of the operation which are significant only in the presence of received signals. For this purpose assume, again, that no beacon is receiving and replying to the challenge but that other aircraft within the range of the receiver are transmitting random pulses which may be accepted and which, to the distance-measuring equipment, appear to be reply pulses. For the most part, in any such operating condition, there will be only a very few random pulses of the order of two or three received during any position of the gate.

The first pulse intercepted by antenna system 13, 14 within the duration of the wide gate is translated by the receiver of unit 20. It arrives at control electrode 23 of the first stage 22 of wide-gate amplifier 21 at a time when the wide-gate pulse is present on control electrode 24. This received pulse is passed on by amplifier 21 to the counter circuit 90, being applied with positive polarity to the cathode follower 91 of the counter from the second amplifier stage 27. The received pulse is translated by cathode follower 91 and is rectified by the counter diode 92, establishing an incremental charge on the accumulating or counting condenser 96. Tube 97 which is normally biased to cutoff is rendered conductive by this first incremental charge and, with the tube conductive, there is a feedback established from the anode to the control electrode through condenser 96. This feedback causes the discharge time constant of the condenser to be extremely high, having a value determined by the amplification factor of tube 97. The long discharge time constant causes the counter to have what is conveniently referred to as a "long memory," meaning that the incremental charge applied to condenser 96 in response to the first pulse translated by the receiver channel 20—21 is retained until a normally inactive fast-discharge circuit for condenser 96 is actuated.

When the second random pulse is received, for the assumed conditions that two pulses appear during a particular gating interval, it is translated in the same manner as the first pulse, is rectified by the counter diode 92 and adds a second incremental charge to condenser 96. While the added charge increases the conductivity of tube 97, causing its anode potential to decrease, the change in potential thus applied to the control electrode of tube 99 controlling the search relay apparatus 100 is insufficient to block tube 99 and actuate the search relay. Therefore, reception of two random pulses, as described, has no effect on the sweeping of the gating interval throughout its range to accomplish searching.

In order that the aggregate of the random pulses which are received during one complete sweep cycle may not control the equipment to establish a false indication of distance, the counter circuit 90 is reset at spaced intervals during the sweep cycle of the gate. The resetting function is also provided by the relaxation oscillator included in unit 40 which causes the stepwise advance of the gating interval over its range, as already described. The pulse resulting from each discharge of condenser 41 is applied with negative polarity by way of condenser 48 to the suppressor electrode of tube 97 to interrupt current flow to the anode. With the space current of the tube 97 blocked at the anode and with a positive charge on condenser 96 as the result of received pulses, a fast-discharge circuit for the condenser 96 is completed between the control electrode and cathode elements of tube 97 functioning as a diode. Each time this circuit is completed, condenser 96 is discharged and the counter is reset to what may be considered as zero count or registration. Preferably, the counter is reset in the manner described with each step advance of the gating interval so that the registration of the counter is always limited to the response of the equipment for one position of the gating interval within its range. In other words, the count is wiped out at each step in the sweep cycle of the gating interval.

Figure 3A:
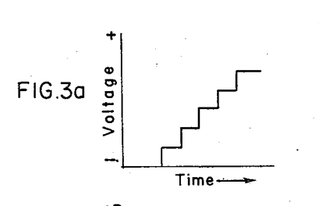
Figure 3B:
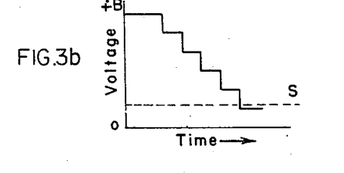

To complete an understanding of the operation, it will be assumed that the gating intervals occur, relative to the transmission of a challenge, as indicated by the pulse components $P_1''$ and $P_2''$ of curves F and G, respectively. It will also be assumed that a reply pulse R of curve H is returned from a beacon for each pulse of the challenge transmitted within the duration of the wide-gate pulse $P_1''$. For this operating condition, condenser 96 of the counter circuit is step charged by the reply pulses R and builds up a potential in the manner indicated by the curve of Fig. 3a. The anode potential of tube 97 and grid potential of tube 99 vary in similar fashion as shown by the curve of Fig. 3b. When the fifth reply pulse has been received and translated, the grid potential of tube 99 falls below a critical value represented by the horizontal line S. This critical value of potential S is that which biases the relay control tube 99 to cutoff, actuating relay 100 and opening the normally closed contact 100a of the relaxation oscillator in unit 40. At that moment the operating bias supplied to gas tube 43 is changed to a value $E_{c_2}$ which holds that tube blocked, thereby disabling the control-pulse relaxation generator to interrupt both the sweeping of the gates and the periodic resetting of the counter condenser 96.

With the relaxation oscillator disabled and the sweeping process interrupted, the control of the time relation of the gating intervals with reference to the transmission of the challenge pulses is transferred exclusively to the tracking circuit 60. When the appearance of the reply pulse R is related to the wide-gate pulse $P_1''$ and to the narrow-gate pulse $P_2''$ in the manner represented in Fig. 2, the reply occurs within the duration of the wide gate but after the termination of the narrow-gate interval. For this condition, signal translation is completed only through units 20–21 to the counter 90 and to the tracking circuit 60. Rectification by the tracking diode 63 of the negative pulse output of wide-gate amplifier 21 causes the control-electrode potential of tube 65 to change in a negative direction, increasing the potential of cathode follower 61 and the delay bias established on the diode 50. With the increased delay bias, both the wide-gate and narrow-gate intervals are further delayed relative to the transmission of the challenge to bring the reply R within both gates.

When the reply occurs within both gates, signals are simultaneously applied to each of the tracking diodes 63 and 64 but the latter receive a pulse of greater intensity in view of the higher gain of amplifier 33. The over-all result is a change of the control-electrode potential of tube 65 in a positive sense, a reduction of the delay bias of diode 50 and an earlier appearance of the gates. Thus, it is seen that tracking diodes 63 and 64, by adjusting the time delay of the gates in opposite senses, cause the equipment to track the response R once the preselected number of replies, five for the assumed case, have been received within a given gating interval. With the equipment tracking as indicated, and the search sweep interrupted, a reading of distance may be obtained as follows.

The desired distance indication is directly related to the delay bias of diode 50 and therefore may be measured by a range-calibrated voltmeter 84 applied across the cathode load 61 of the tracking circuit. After the distance measurement has been obtained from range meter 84, relay contact 100a, may, if desired, be manually closed to continue the search cycle previously interrupted, thereby to search for distance indications relative to other replying beacons or stations within the range of the equipment.

It will be understood that the example discussed, in which five replies out of fifteen challenges are needed to arrest the sweep and actuate the tracking function, is merely an illustration of one embodiment of the invention. By appropriate selection of the circuit constants and operating potentials, the equipment may be adjusted to have the operation described when any preselected number of replies are received out of any desired number of challenges transmitted during a particular setting of the gating interval. However, for the case chosen, the following constants and operating potentials are found useful in a practical system:

Units 40 and 60:
| | |
|---|---|
| Tube 43 | Type 6D4 |
| Tube 65 | Type 6AU6 |
| Resistor 42 | 1.5 megohms |
| Resistor 45 | 470 kilohms |
| Anode resistor of tube 65 | 470 kilohms |
| Condenser 41 | 0.1 microfarad |
| Condenser 66 | 0.5 microfarad |
| Condenser 48 | 0.01 microfarad |
| +B for tube 43 | 300 volts |
| +B for tube 65 | 300 volts |
| +Sc for tube 65 | 75 volts |
| $E_{c_1}$ | −12 volts |
| $E_{c_2}$ | −40 volts |

Unit 90:
| | |
|---|---|
| Tube 91 | ½ section of a type 12AU7 |
| Tube 97 | Type 6AS6 |
| Tube 99 | ½ section of a type 12AU7 |
| Resistor 93 | 470 kilohms |
| Resistor 94 | 3.3 megohms |
| Resistor 95 | 22 kilohms |
| Resistor 101 | 1 megohm |
| Condenser 96 | 0.1 microfarad |
| Anode resistor of tube 97 | 330 kilohms |
| +B for tube 95 | 300 volts |
| +B for tube 97 | 300 volts |
| Sc for tube 97 | 75 volts |
| Ec for tube 97 | −8 volts |
| Ek for tube 99 | 150 volts |

In the foregoing description of the distance-measuring equipment embodying this invention, it has been assumed that a single beacon or ground station is within the range of the equipment to reply to challenges thereof. Where several beacons concurrently receive the challenge of the equipment, it is desirable to permit a selection of a particular beacon and this is most readily accomplished by coding the transmitted challenge. Coding of the challenge in one embodiment involves transmitting grouped pairs of pulses to constitute a challenge with a preselected spacing between the grouped pulses of each pair identifying the beacon challenged. The beacons may also include coding features so that a challenge, which causes the response from one, is not accepted and answered by the others. Beacon and transmitting coding in this fashion is well understood in the art but has been omitted from the drawings for the sake of simplicity.

The described equipment has definite operating advantages over those of the prior art. The feature of periodically resetting the counter enables the system to take advantage of the added freedom from undesired signals inherent in requiring a large number of replies to interrupt the sweep. Such a feature is especially beneficial when used, as in Fig. 1, in a system wherein the search is achieved by a step-by-step advance of the gating intervals over a prescribed range. The accuracy of the search is determined by the separation or overlapping of the wide gate as between two successive steps of the sweep. In Fig. 2 the first step P₁ is shown as having a greater separation from the second step P₁' than would normally be employed but this is by way of illustration only to facilitate an understanding of the step movement. In the most efficient systems, it is more desirable to have succeeding positions of the wide gate overlap one another substantially.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for translating pulses of signal energy which may occur with a time delay, relative to a reference time, that is variable over a predetermined range of time delays comprising: a channel for translating said pulses but normally maintained in a nontranslating condition; a counter circuit coupled to said channel for counting the number of pulses translated therethrough; a gating system for conditioning said channel to translate pulses received throughout a gating interval or a preselected duration small relative to said range; sweep means, including a control-pulse generator, for so controlling said gating system that the occurrence of said gating interval, relative to said reference time, sweeps in discrete steps over said range at a rate determined by the repetition frequency of the control pulses of said generator; and means responsive to said control pulses for establishing a predetermined setting of said counter circuit with each sweep step of said gating interval.

2. A system for translating pulses of signal energy which may occur with a time delay, relative to a reference time, that is variable over a predetermined range of time delays comprising: a channel for translating said pulses but normally maintained in a nontranslating condition; a counter circuit coupled to said channel for counting the number of pulses translated therethrough; a gating system, having a synchronizing circuit, for conditioning said channel to translate pulses received throughout a gating interval of a preselected duration small relative to said range; sweep means, including a control-pulse generator, for applying synchronizing pulses to said synchronizing circuit so to control said gating system that the occurrence of said gating interval, relative to said reference time, sweeps in discrete steps over said range at a rate determined by the repetition frequency of the control pulses of said generator; and reset means responsive to said control pulses for establishing a predetermined setting of said counter circuit with each sweep step of said gating interval.

3. A system for translating pulses of signal energy which may occur with a time delay, relative to a reference time, that is variable over a predetermined range of time delays comprising: a channel for translating said pulses but normally maintained in a nontranslating condition; a gating system, having a synchronizing circuit, for conditioning said channel to translate pulses received throughout a gating interval of a preselected duration small relative to said range; and a sweep control-pulse generator for controlling the application of synchronizing pulses to said synchronizing circuit so to control said gating system that the occurrence of said gating interval relative to said reference time, sweeps in discrete steps over said range at a rate determined by the repetition frequency of said synchronizing pulses.

4. A system for translating pulses of signal energy which may occur with a time delay, relative to a reference time, that is variable over a predetermined range of time delays comprising: a channel for translating said pulses but normally maintained in a nontranslating condition; a gating system, having a synchronizing circuit, for conditioning said channel to translate pulses received throughout a gating interval of a preselected duration small relative to said range; a control-pulse generator; an energy-storage device to be step charged by said control pulses; and means, responsive to the charge of said device, for applying synchronizing pulses to said synchronizing circuit so to control said gating system that the occurrence of said gating interval, relative to said reference time, sweeps in discrete steps over said range at a rate determined by the repetition frequency of said control pulses.

5. A system for translating pulses of signal energy which may occur with a time delay, relative to a reference time, that is variable over a predetermined range of time delays comprising: a channel for translating said pulses but normally maintained in a nontranslating condition; a gating system, having a synchronizing circuit, for conditioning said channel to translate pulses received throughout a gating interval of a preselected duration small relative to said range; a control-pulse generator; an energy-storage device to be step charged by said control pulses; and time-delay means, exhibiting a delay determined by the charge of said device, for applying synchronizing pulses to said synchronizing circuit so to control said gating system that the occurrence of said gating interval, relative to said reference time, sweeps in discrete steps over said range at a rate determined by the repetition frequency of said control pulses.

6. A system for translating pulses of signal energy which may occur with a time delay, relative to a reference time, that is variable over a predetermined range of time delays comprising: a channel for translating said pulses but normally maintained in a nontranslating condition; a gating system having a synchronizing circuit, for conditioning said channel to translate pulses received throughout a gating interval of a preselected duration small relative to said range; means, including a sweep control-pulse generator, for applying synchronizing pulses to said synchronizing circuit for so controlling said gating system that the occurrence of said gating interval, relative to said reference time, sweeps in discrete steps over said range at a rate determined by the repetition frequency of said control pulses; and means, actuated after said gating interval has been swept over said range, for initiating another sweep cycle.

7. A system for translating pulses of signal energy which may occur with a time delay, relative to a reference time, that is variable over a predetermined range of time delays comprising: a channel for translating said pulses but normally maintained in a nontranslating condition; a gating system, having a synchronizing circuit, for conditioning said channel to translate pulses received throughout a gating interval of a preselected duration small relative to said range; a control-pulse generator; an energy-storage device to be step charged by said control pulses; time-delay means, exhibiting a delay determined by the charge of said device, for applying synchronizing pulses to said synchronizing circuit so to control said gating system that the occurrence of said gating interval, relative to said reference time, sweeps in discrete steps over said range at a rate determined by the repetition frequency of said control pulses; and means for discharging said device after said gating interval has been swept over said range to initiate another sweep cycle.

8. A system for translating pulses of signal energy which may occur with a time delay, relative to a reference time, that is variable over a predetermined range of time delays comprising: a channel for translating said pulses but normally maintained in a nontranslating condition; a gating system, having a synchronizing circuit, for conditioning said channel to translate pulses received throughout a gating interval of a preselected duration small relative to said range; a control-pulse generator; an energy-storage device to be step charged by said control pulses; time-delay means, exhibiting a delay determined by the charge of said device, for applying synchronizing pulses to said synchronizing circuit so to control said gating system that the occurrence of said gating interval, relative to said reference time, sweep in discrete steps over said range at a rate determined by the repetition frequency of said control pulses; a normally open discharge circuit for said energy-storage device; and relay apparatus coupled to said device and actuated thereby after said gating interval has been swept over said range to close said discharge circuit and initiate another sweep cycle.

9. A system for translating pulses of signal energy which may occur with a delay, relative to a reference time, that is variable over a predetermined range of time delays comprising: a channel for translating said pulses but normally maintained in a nontranslating condition; a counter circuit coupled to said channel for counting the number of pulses translated therethrough and including a normally inactive reset circuit for selectively resetting said counter circuit to a particular setting; a gating system for conditioning said channel to translate pulses received throughout a gating interval of a preselected duration small relative to said range; sweep means for so controlling said gating system that the occurrence of said gating interval, relative to said reference time, sweeps over said range at a predetermined rate; and means for actuating said reset circuit at spaced intervals as said gating interval sweeps over said range.

10. A system for translating pulses of signal energy which may occur with a delay, relative to a reference time, that is variable over a predetermined range of time delays comprising: a channel for translating said pulses but normally maintained in a nontranslating condition; a counter circuit coupled to said channel for counting the number of pulses translated therethrough and comprising an energy-storage device to be step charged by said pulses and a normally inactive fast discharge circuit for said device; a gating system for conditioning said channel to translate pulses received throughout a gating interval of a preselected duration small relative to said range; sweep means for so controlling said gating system that the occurrence of said gating interval, relative to said reference time, sweeps over said range at a predetermined rate; and means for actuating said discharge circuit at spaced intervals as said gating interval sweeps over said range periodically to reset said counter circuit.

11. A system for translating pulses of signal energy which may occur with a delay, relative to a reference time, that is variable over a predetermined range of time delays comprising: a channel for translating said pulses but normally maintained in a non-translating condition; a counter circuit coupled to said channel for counting the number of pulses translated therethrough and including a normally inactive reset circuit for selectively resetting said counter circuit to a particular setting; a gating system for conditioning said channel to translate pulses received throughout a gating interval of a preslected duration small relative to said range; sweep means for so controlling said gating system that the occurrence of said gating interval, relative to said reference time, sweeps over said range at a predetermined rate; means for actuating said reset circuit at spaced intervals as said gating interval sweeps over said range; and means responsive to a preselected setting of said counter circuit corresponding to the translation of a given number of pulses through said channel for retaining said reset circuit in its normally inactive state.

12. A system for translating pulses of signal energy which may occur with a delay, relative to a reference time, that is variable over a predetermined range of time delays comprising: a channel for translating said pulses but normally maintained in a nontranslating condition; a counter circuit coupled to said channel for counting the number of pulses translated therethrough and including a normally inactive reset circuit for selectively resetting said counter circuit to a particular setting; a gating system for conditioning said channel to translate pulses received throughout a gating interval of a preselected duration small relative to said range; sweep means for so controlling said gating system that the occurrence of said gating interval, relative to said reference time, sweeps over said range at a predetermined rate; means for actuating said reset circuit at spaced intervals as said gating interval sweeps over said range; and means responsive to a preselected setting of said counter circuit corresponding to the translation of a given number of pulses through said channel for retaining said reset circuit in its normally inactive state and for disabling said sweep means to interrupt sweeping of said gating interval.

13. A system for translating pulses of signal energy which may occur with a delay, relative to a reference time, that is variable over a predetermined range of time delays comprising: a channel for translating said pulses but normally maintained in a nontranslating condition; a counter circuit coupled to said channel for counting the number of pulses translated therethrough and comprising an energy-storage device to be step charged by said pulses and a normally inactive fast discharge circuit for said device; a gating system for conditioning said channel to translate pulses received throughout a gating interval of a preselected duration small relative to said range; sweep means for so controlling said gating system that the occurrence of said gating interval, relative to said reference time, sweeps over said range at a predetermined rate; means for actuating said discharge circuit at spaced intervals as said gating interval sweeps over said range; and relay apparatus coupled to said counter circuit and actuated in response to a predetermined charge on said energy-storage device for retaining said discharge circuit in its inactive condition and for disabling said sweep means to interrupt the sweeping of said gating interval.

14. A system for translating pulses of signal energy which may occur with a time delay, relative to a reference time, that is variable over a predetermined range of time delays comprising: a channel for translating said pulses but normally maintained in a nontranslating condition; a counter circuit coupled to said channel for counting the number of pulses translated therethrough; a gating system for conditioning said channel to translate pulses received throughout a gating interval of a preselected duration small relative to said range; sweep means, including a control-pulse generator, for so controlling said gating system that the occurrence of said gating interval, relative to said reference time, sweeps in discrete steps over said range at a rate determined by the repetition frequency of the control pulses of said generator; reset means responsive to said control pulses for establishing a predetermined setting of said counter circuit with each sweep step of said gating interval; and means coupled to said counter circuit and actuated thereby when a preselected number of pulses are counted in any given position of said gating interval within said range for disabling said generator to interrupt the operation of said sweeping means and said reset means.

15. A system for translating pulses of signal energy which may occur with a time delay, relative to a reference time, that is variable over a predetermined range of time delays comprising: a channel for translating said pulses but normally maintained in a nontranslating condition; a counter circuit coupled to said channel for counting the number of pulses translated therethrough; a gating system for conditioning said channel to translate pulses received throughout a gating interval of a preselected duration small relative to said range; sweep means, including a control-pulse generator, for so controlling said gating system that the occurrence of said gating interval, relative to said reference time, sweeps in discrete steps over said range at a rate determined by the repetition frequency of the control pulses of said generator; reset means responsive to said control pulses for establishing a predetermined setting of said counter circuit with each sweep step of said gating interval; and relay apparatus coupled to said counter circuit and actuated thereby when a preselected number of pulses are counted in any given position of said gating interval within said range for disabling said generator to interrupt the operation of said sweeping means and said reset means.

16. A system for translating pulses of signal energy which may occur with a time delay, relative to a reference time, that is variable over a predetermined range of time delays comprising: a channel for translating said pulses but normally maintained in a nontranslating condition; a counter circuit coupled to said channel for counting the number of pulses translated therethrough; a gating system for conditioning said channel to translate pulses received throughout a gating interval of a preselected duration small relative to said range; sweep means, including a control-pulse generator, for so controlling said gating system that the occurrence of said gating interval, relative to said reference time, sweeps in discrete steps over said range at a rate determined by the repetition frequency of the control pulses of said generator; and reset means responsive to said control pulses for establishing a predetermined setting of said counter circuit with each sweep step of said gating interval; relay apparatus coupled to said counter circuit and actuated thereby when a preselected number of pulses are counted in any given position of said gating interval within said range for disabling said generator to interrupt the operation of said sweeping means and said reset means, and means for indicating the position of said gating interval within said range when the operation of said sweep means is interrupted.

17. A system for translating pulses of signal energy which may occur with a time delay, relative to a reference time, that is variable over a predetermined range of time delays comprising: a channel for translating said pulses but normally maintained in a nontranslating condition; a counter circuit coupled to said channel for counting the number of pulses translated therethrough; a gating system for conditioning said channel to translate pulses received throughout a gating interval of a preselected duration small relative to said range; sweep means, including a control-pulse generator, for so controlling said gating system that the occurrence of said gating interval, relative to said reference time, sweeps in discrete steps over said range at a rate determined by the repetition frequency of the control pulses of said generator; and reset means responsive to said control pulses for establishing a predetermined setting of said counter circuit with each sweep step of said gating interval; relay apparatus coupled to said counter circuit and actuated thereby when a preselected number of pulses are counted in any given position of said gating interval within said range for disabling said generator to interrupt the operation of said sweeping means and said reset and relay apparatus; and means responsive to the control pulses supplied by said generator for indicating the position of said gating interval within said range.

ROBERT B. J. BRUNN.

REFERENCES CITED

The following references are of record in the file of this patent:

UNITED STATES PATENTS

| Number | Name | Date |
|---|---|---|
| 2,211,942 | White | Aug. 20, 1940 |
| 2,227,057 | Blumlein | Dec. 31, 1944 |
| 2,361,437 | Trevor | Oct. 31, 1944 |
| 2,407,898 | Norgaard | Sept. 17, 1946 |